United States Patent

[11] 3,596,567

[72] Inventors Milton L. Benjamin;
 David D. Walker, both of Chagrin Falls, Ohio
[21] Appl. No. 849,374
[22] Filed Aug. 12, 1969
[45] Patented Aug. 3, 1971
[73] Assignee Erickson Tool Company, Solon, Ohio

[54] FAIL-SAFE VALVE ASSEMBLY FOR POWER CHUCK MOTORS AND THE LIKE
 10 Claims, 3 Drawing Figs.
[52] U.S. Cl. ................................................. 91/420,
 137/54, 137/57, 137/596.14, 137/596.18
[51] Int. Cl. ........................................................F15b 11/08,
 F15b 13/042
[50] Field of Search............................................ 91/220,
 420, 432, 445, 435; 137/57, 54, 596.14, 596.18;
 279/4

[56] References Cited
UNITED STATES PATENTS
| | | | |
|---|---|---|---|
| 2,853,167 | 9/1958 | Kelley | 137/58 X |
| 2,993,473 | 7/1961 | Hohwart et al. | 279/4 |
| 3,265,081 | 8/1966 | Stockton et al. | 137/56 X |
| 3,266,506 | 8/1966 | Takahashi et al. | 137/56 X |
| 3,364,823 | 1/1968 | Benjamin et al. | 91/420 |
| 3,369,464 | 2/1968 | Blattry | 91/420 |
| 3,411,415 | 11/1968 | Benjamin et al. | 91/420 |

*Primary Examiner*—Martin P. Schwadron
*Assistant Examiner*—Irwin C. Cohen
*Attorney*—Oberlin, Maky, Donnelly & Renner ABSTRACT: A fail-safe control valve assembly for rotatable fluid motors. The valve assembly rotates with the motor and a pair of free floating check valve members of the assembly are movable radially against their valve seats aided by centrifugal action to trap fluid in the motor in the event of loss of source pressure.

One of the check valve members controls inlet flow and the other exhaust flow, or vice versa, depending upon the direction in which the motor is actuated. Valve spools exposed to the inlet and exhaust flow pressure differential act on the valve members to hold that valve member controlling exhaust flow removed from its valve seat. The spools are radially movable outward away from the valve seats to facilitate valve closing.

PATENTED AUG 3 1971
3,596,567
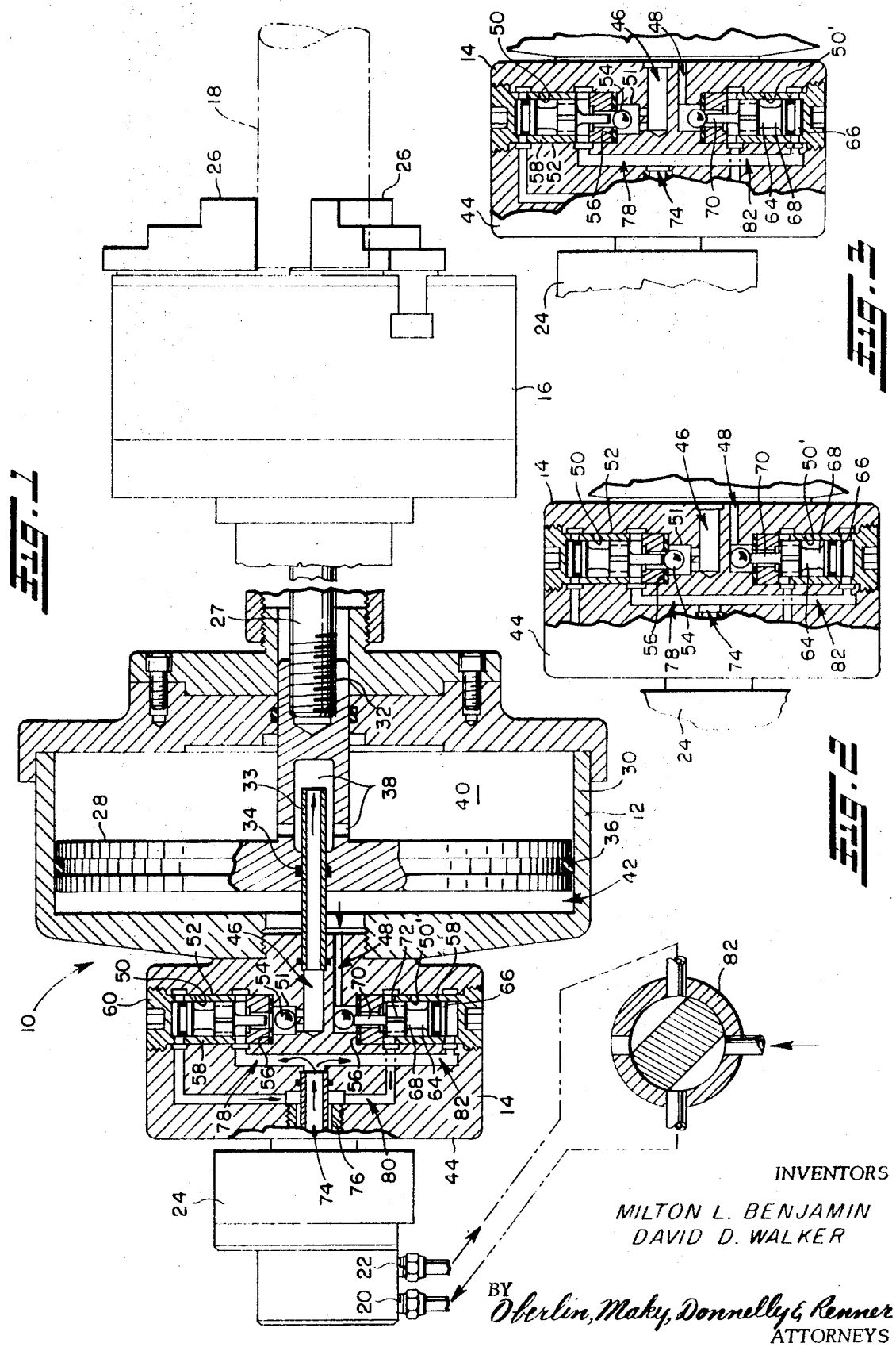
INVENTORS
MILTON L. BENJAMIN
DAVID D. WALKER
BY Oberlin, Maky, Donnelly & Renner
ATTORNEYS

FAIL-SAFE VALVE ASSEMBLY FOR POWER CHUCK MOTORS AND THE LIKE

BACKGROUND OF THE INVENTION

The present invention relates to a control valve assembly for rotatable fluid motors, and more particularly to a novel control valve assembly for use with drawbar operated power chucks by which a workpiece is held clamped despite the loss of fluid actuating pressure.

Prior U.S. Pat. No. 3,411,415, Benjamin et al., issued Nov. 19, 1968, and assigned to the assignee of the present application, describes a fluid motor and control valve assembly in which the poppet of the control valve assembly is located on center with respect to the axis of rotation of the motor. In the patent, it was indicated that control valve assemblies for trapping the operating fluid in a motor to hold a chuck in a chucking position were known. However, in the event of loss of fluid pressure for actuating the chuck, such prior assemblies were effective to trap the fluid only when the chuck was stationary or rotating at relatively slow speeds. The centrifugal force which developed at high operating speeds caused a slight shifting of the movable parts of the control valve assembly to positions whereat there was leakage of the trapped fluid. By positioning the movable poppet of the valve on center with respect to its axis of rotation in accordance with said prior patent, the affect of such centrifugal force was nullified.

OBJECTS OF THE INVENTION

It is an object of the present invention to provide a still further improved control valve assembly for fluid motors, and in particular a simplified valve of reduced cost in which the centrifugal force of high-speed rotation favorably acts on the movable parts of the valve assembly and contributes to trapping of motor fluid in the event of loss of fluid-actuating pressure.

It is further an object of the present invention to provide a novel control valve assembly for fluid motors in which the valve components are a nonintegral part of the motor, whereby the assembly is usable with different types of motors and power chucks.

It is still further an object of the present invention to provide a self-contained control valve assembly which can be used with existing power chuck installations.

SUMMARY OF THE INVENTION

In accordance with the present invention, there is provided in a control valve assembly for rotatable fluid motors having a valve housing which rotates with the motor, a pair of passages in the housing acting alternatively as inlet and exhaust passages depending upon the direction in which the motor is actuated, the improvement comprising valve chambers in which check valve members are movable radially outward relative the axis of rotation of the housing to close the passages. In the event of loss of fluid-actuating pressure, centrifugal force acting on the check valve members contributes to such closing trapping the fluid acting on the motor.

Preferably the check valve members are balls movable radially outward against valve seats in the valve chambers.

In accordance with a further aspect of the invention, the valve housing contains a pair of valve spools which are appropriately connected with the inlet and exhaust passages to dislodge that valve member controlling exhaust flow from its valve seat. The valve spools are movable radially outward away from the valve seats so that centrifugal force acting on the spools also facilitates closing the passages in the event of loss of actuating fluid pressure.

Preferably the valve assembly is a self-contained unit in which the inlet and exhaust passages thereof can be connected between the connections of any standard actuator or fluid motor and a standard swivel coupling associated with a source of pressure.

To the accomplishment of the foregoing and related ends, the invention then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In such annexed drawing:

FIG. 1 is a longitudinal cross section view of a preferred embodiment of a control valve assembly and fluid motor in accordance with this invention, the motor being connected to a chuck or the like with the jaws of the chuck in a workpiece engaging position;

FIG. 2 is a fragmentary cross section view of the valve assembly of FIG. 1 illustrating the position of components of the valve assembly during high-speed rotation of the chuck; and FIG. 3 is a fragmentary cross section view of the valve assembly of FIG. 1 illustrating the position of components of the valve assembly in the event of loss of actuating fluid pressure.

Turning now to the details of the preferred form of the invention, there is illustrated in FIG. 1 a fluid motor and control valve combination 10 comprising a motor 12 and valve assembly 14 tandem connected with a chuck 16 of conventional design, the latter engaging a workpiece 18 shown in phantom lines. The combination 10 with the chuck 16 rotates about a longitudinal axis defined by the workpiece 18. The motor is air operated, the valve assembly 14 being provided at one end with inlet and outlet ports 20 and 22. The ports of necessity are connected to stationary hoses, and a swivel coupling 24 of conventional design is provided between the ports and the rotating assembly 14.

The jaws 26 of the chuck 16 in the position shown are engaging the outer surface of the workpiece 18. These jaws are shown only schematically, and conventionally are radially movable relative the face of the chuck towards and away from its axis of rotation to bring them into or out of engagement with the workpiece.

A longitudinally movable axially aligned actuating rod 27 provides the driving force for movement of the jaws, a piston 28 within the motor housing 30 in turn reciprocally driving the actuating rod, through threaded connection 32. Various means within the chuck body can be used to transmit longitudinal movement of the rod 27 to radial movement of the jaws 26, one such means being that shown in prior U.S. Pat. NO. 3,411,415, mentioned above. In the patent, a plurality of radially positioned levers are provided engaging the jaws, and cam surfaces on the rod 27 move the levers. Regardless of the means used, it is apparent that the motor 12 during operation must be capable of continually urging the rod in the direction required to keep the jaws in workpiece gripping position. In the absence of such urging, centrifugal force resulting from rapid rotation of the chuck could cause the jaws to release the workpiece.

In the embodiment shown, movement of the actuating rod 27 and piston 28 to the left brings the chuck jaws into engagement with the workpiece 18. For a different type of chuck, the opposite could be the case. Such movement is accomplished by means of an axially extending stationary inlet tube 33 along which the piston 28 slides, sealed by a small-diameter O-ring seal 34. The piston in turn is sealed in the housing 30 by an O-ring seal 36. High-pressure fluid introduced along the stationary inlet tube enters passageway 38 and flows into the high-pressure, right-hand side 40 of the piston, causing the latter to move to the left, in turn moving the actuating rod 27 with it. By virtue of O-ring seal 36, chamber 42 on the left-hand side of the piston 28 becomes the low-pressure exhaust side.

In accordance with the present invention, the valve mechanism to control the flow of air into and out of the motor 12 comprises a block valve housing 44 defining an axially aligned inlet passage 46 in communication with the stationary inlet tube 33, and an exhaust passage 48 alongside the inlet passage 46. Instead of being side-by-side, the two passages can be coaxially arranged.

The valve housing also defines a pair of radially oriented similar valve chambers 50 and 50', each passage being in flow communication with one of the chambers. In the embodiment shown, the valve chambers are in radial alignment in the valve housing block, and are formed simply by boring radially inward through the block from opposite sides to the depth of the passages 46 and 48. Because of the similarity of the valve chambers and mechanisms therein, the same numbers will be assigned to the parts thereof. Each of the chambers is provided with a smaller diameter portion 51 which is closest to the passages 46, 48, and a slightly larger diameter portion 52 leading to the outer periphery of the valve housing. Balls 54 are contained within the smaller diameter portion by means of rubber valve seats 56. The latter are held in place by means of generally cylindrical bearings 58 seated in the larger diameter portion 52, in turn held in place by means of caps 60 threaded into the housing.

It is apparent that the centrifugal force of rapid rotation of the valve housing biases the balls 54 radially outwardly against their valve seats.

Each valve chamber is provided with a radially oriented spool 64 contained within cylindrical bearings 58. The spools comprise a piston 66, and an inwardly directed stem 68 terminating in a narrow diameter neck 70, the latter being of sufficiently narrow diameter to penetrate the opening defined by valve seat 56. Radial fingers 72 on the valve spool between the neck 70 and piston 66 guide the spool within the bearing 58.

On the end of the valve housing 44 spaced from the motor 12, the housing is provided with a centermost inlet passage 74, constituting a continuation of passage 46, and an annular exhaust passage 76 constituting a continuation of exhaust passage 48.

The centermost inlet passage 74 is provided with a branch 78 which leads to the uppermost valve chamber 50, so that the flow of inlet air via passage 74, branch 78, chamber 50, and passages 46, 38 is into the pressure side 40 of piston 28. From the exhaust side 42 of piston 30, the flow in passage 48 is into the lowermost chamber 50', to a branch passage 80, leading to annular exhaust passage 76.

The valve spools 64 have the function of lifting the balls from their seats when necessary. In the illustration of FIG. 1, the actuating rod or drawbar 27 is pulled to the left to grip the workpiece 18. Accordingly, the uppermost valve chamber 50 is connected for inlet flow, and this flow automatically dislodges the ball 54 from its seat. However, the lowermost valve chamber 50' is connected for exhaust flow from passage 48, and the valve spool therefor is required to hold the ball in the chamber from its seat for such flow. To accomplish this, a second high-pressure branch 82 is provided connected with the centermost inlet passage 74 leading to the piston side of the spool for the lower valve chamber. High pressure in the inlet passage moves the spool radially inward or upwardly, the narrow neck 70 of the spool lifting the ball from its seat.

To cause the piston 28 to push the actuating rod or drawbar to the right, to release the workpiece 18, the side 42 of the piston 28 must be the high-pressure side, and the side 40 the exhaust side. This is accomplished by manually operating the conventional four-way reversing valve 82 reversing the flow in connections 20 and 22 leading to swivel coupling 24. The functions of the spools 64 are thus reversed, and the uppermost ball 54 is held off its seat for exhaust flow through passage 46, inlet flow being through passage 48.

In the illustration of FIG. 2, the chuck is undergoing high-speed rotation, as are the motor and valve assembly. The chuck is in a work-engaging position so that the motor piston 28 is stationary and there is virtually no flow of air (except for insignificant leakage) into and out of the high-pressure chamber 40 of the motor. The upper spool, exposed to minimal exhaust pressure, is in an outward retracted position. Centrifugal force acts on the ball 54 forcing it against its seat. In the event of sudden loss of air pressure, the position of the ball against its seat prevents leakage of air, even initially, from the motor high-pressure chamber 40, and continued gripping pressure of the chuck jaws on the workpiece thereby is assured. There is no time lag between loss of pressure and sealing of the high-pressure passage which would be experienced with conventional check valve mechanisms. Accordingly, there is minimal danger of the workpiece being released from the chuck and injury to the operator.

Following loss of pressure, the lower valve spool during rotation moves as shown in FIG. 3 in a radial direction under the influence of centrifugal force, also allowing the lower ball to move against its seat. It is not necessary that this occur, although it provides further assurance the piston 30 will be locked in position in the event of loss of pressure.

Advantages of the invention should be apparent. In particular, the motor will hold the workpiece clamped in a fail-safe manner, regardless of whether the loss of pressure is in the swivel coupling, in the inlet hoses, in the four-way valve, or in the compressor or pump. Centrifugal force, rather than adversely affecting action of the valve assembly, is used to eliminate the time lag which normally exists with check valves between loss of pressure and sealing the motor pressure chamber.

The threaded sealed connection between the valve housing 44 and motor assures that no loss of pressure occurs between the valve assembly and motor.

Further, it is apparent that the valve mechanism has a minimum number of machined parts and is simple in construction, making it less expensive than mechanisms heretofore made for this purpose.

In addition, it is apparent that the valve mechanism can be used with a variety of different motors and chucks, and can be applied to motor-chuck assemblies presently in use. Modification of the motor or actuator is not required. In this respect, the valve assembly and motor-chuck assembly can be sold independently or in combination.

We, therefore, particularly point out and distinctly claim as our invention:

1. A fail-safe rotatable valve assembly for reversible power chuck motors and the like comprising
   a valve housing defining first and second passages;
   means mounting said valve housing for rotation;
   means for exposing said passages to a source pressure and to an exhaust pressure, respectively;
   means for reversing the exposure so that the passages are exposed to exhaust and source pressure, respectively;
   free floating check valve means in said passages;
   check valve seats in said passages for said check valve means positioned relative the valve means such that centrifugal force resulting from rotation of the valve housing biases the valve means against the valve seats;
   an actuating means for engaging and holding each said check valve means spaced from its associated valve seat; and
   means for energizing each actuating means when the passage and check valve means associated therewith are exposed to exhaust reference pressure for thereby opening said passage.

2. The valve assembly of claim 1 wherein each actuating means is a member movable to engage the check valve means and to dislodge the valve means from its associated valve seat, each actuating means being movable radially in said valve housing and positioned relative to the check valve means such that centrifugal force resulting from rotation of the valve housing biases the actuating means away from and out of engagement with the check valve means.

3. The valve assembly of claim 2 wherein each actuating means is a piston actuator including a stem means aligned with movement of the check valve means arranged to engage the latter, said valve housing including means for communicating each piston actuator with source pressure when the check valve means associated therewith is exposed to reference exhaust pressure, said source pressure energizing the actuating means.

4. The valve assembly of claim 3 wherein said check valve means are ball valves.

5. The valve assembly of claim 4 including valve chambers in which said check valve means are movable, said valve chambers being radially bored openings in said valve housing extending from the outer periphery of the housing into communication with the passages in said housing, each chamber comprising an insert therein forming said valve seats, the inserts having radially extending openings through which the piston actuator stem means extend, said piston actuators being movable in said radially bored openings outboard of said inserts.

6. The valve assembly of claim 3 including means in said valve housing communicating the reference exhaust pressure with that piston actuator associated with the check valve means exposed to source pressure whereby the piston actuator is freely movable out of engagement with the check valve means.

7. A rotatable fail-safe motor valve assembly including
    a motor housing and reciprocable piston means therein;
    a valve housing including first and second passages communicating with opposite sides of said piston means;
    means mounting said motor housing and said valve housing for rotation;
    means for exposing said passages to a source pressure and an exhaust pressure respectively;
    means for reversing the exposure so that the passages are exposed to exhaust and source pressure, respectively;
    separate valve chambers for each of said passages, the improvement comprising
    free floating check valve means movable in said chamber;
    valve seats for said check valve means to close said chambers;
    said valve seats being positioned relative the check valve means whereby centrifugal force on the valve means biases the latter against the valve seats;
    an operator means for engaging said valve means to dislodge each said valve means from the respective valve seat, each said operator means also being biased radially outward away from the valve means by centrifugal force acting thereon; and
    means for exposing either of said operator means to said source pressure when the valve means associated therewith is exposed to exhaust pressure thereby energizing the operator means into engagement with said check valve means.

8. An assembly according to claim 7 further including means for exposing the exhaust reference pressure to the operator means associated with the valve means exposed to source pressure to thereby permit such operator means to move radially outward away from the valve means when centrifugal force acts thereon.

9. A rotatable fail-safe valve assembly for reversible power chuck motors and the like comprising
    a valve housing defining first and second passages;
    means mounting said valve housing for rotation;
    means for exposing said passages to a source pressure and an exhaust reference pressure, respectively;
    means for reversing said exposures;
    free floating check valve means in said passages;
    check valve seats in said passages for said check valve means positioned relative the valve means such that centrifugal force resulting from the rotation of the valve assembly biases the valve means against the valve seats;
    an actuating means for engaging and holding each said check valve means spaced from the respective valve seat; and
    means for exposing either of said actuating means to said source pressure when the valve means associated therewith is exposed to exhaust reference pressure, thereby spacing the associated valve means from its valve seat, and means for disassociating the other of said actuating means from said source pressure whereby the valve means associated therewith is free to move against its valve seat from said centrifugal force.

10. A fail-safe rotatable valve assembly for reversible power chuck motors and the like comprising
    a valve housing defining first and second passages;
    means mounting said valve housing for rotation;
    means for exposing said passage to a source pressure and to an exhaust pressure, respectively;
    means for reversing said exposure;
    free floating check valve means in said passages;
    check valve seats in said passages for said check valve means positioned relative the valve means such that centrifugal force resulting from the rotation of the valve housing biases the valve means against the valve seats;
    an actuating means for engaging and holding each said check valve means spaced from the associated valve seat; and
    means for exposing either of the actuating means to said source pressure when the valve means associated therewith is exposed to exhaust reference pressure, and for exposing the other of said actuating means to exhaust reference pressure when the valve means associated therewith is exposed to source pressure.